US012601753B2

(12) United States Patent (10) Patent No.: US 12,601,753 B2

Miyamoto et al. (45) Date of Patent: Apr. 14, 2026

(54) AUTOMATIC ANALYZER AND ASSEMBLY SUPPORT SYSTEM THEREOF

(71) Applicant: HITACHI HIGH-TECH CORPORATION, Tokyo (JP)

(72) Inventors: Shunsuke Miyamoto, Tokyo (JP); Hiroyuki Mishima, Tokyo (JP); Hajime Yamazaki, Tokyo (JP); Takeshi Setomaru, Tokyo (JP); Akihiro Yasui, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 723 days.

(21) Appl. No.: 17/919,355

(22) PCT Filed: Feb. 3, 2021

(86) PCT No.: PCT/JP2021/003964

§ 371 (c)(1),
(2) Date: Oct. 17, 2022

(87) PCT Pub. No.: WO2021/235015

PCT Pub. Date: Nov. 25, 2021

(65) Prior Publication Data

US 2023/0160917 A1 May 25, 2023

(30) Foreign Application Priority Data

May 22, 2020 (JP) ................................. 2020-089370

(51) Int. Cl.
*G01N 35/10* (2006.01)
*G01N 35/00* (2006.01)

(52) U.S. Cl.
CPC ... *G01N 35/1002* (2013.01); *G01N 35/00732* (2013.01); *G01N 2035/00891* (2013.01)

(58) Field of Classification Search
None
See application file for complete search history.

(56) References Cited

U.S. PATENT DOCUMENTS 6,063,339 A    5/2000  Tisone et al.
6,322,242 B1 * 11/2001 Lang ..................... B01F 33/848
366/163.2

(Continued)

FOREIGN PATENT DOCUMENTS

EP        1044072 B1     6/2009
JP     2003320027 A  * 11/2003

(Continued)

OTHER PUBLICATIONS

Extended European Search Report received in corresponding European Application No. 21806626.4 dated Apr. 11, 2024.

(Continued)

*Primary Examiner* — P. Kathryn Wright

(74) *Attorney, Agent, or Firm* — MATTINGLY & MALUR, PC

(57) ABSTRACT

An automatic analyzer includes: a plurality of dispensing units; and a plurality of pump units connected to the respective dispensing units. Each of the plurality of pump units includes: a syringe tube that has a liquid port at one end and an opening at another end; a syringe base that is attached to the opening at the other end of the syringe tube; a plunger that penetrates the syringe base and whose tip end is inserted inside the syringe tube; a seal piece that is configured to seal a gap between the plunger and the syringe base; an actuator; and a power transmission mechanism that connects the actuator and the plunger. Each plunger of the plurality of pump units has an individually set diameter and a different (Continued)

thickness. At least one of the syringe base and the syringe tube represents the diameter of the corresponding plunger in appearance.

7 Claims, 9 Drawing Sheets

(56)                    References Cited

U.S. PATENT DOCUMENTS

| | | | |
|---|---|---|---|
| 2007/0048194 | A1 | 3/2007 | Schulein et al. |
| 2010/0318036 | A1* | 12/2010 | Kawamura ........ A61M 5/31511 |
| | | | 604/189 |
| 2015/0140669 | A1 | 5/2015 | Boehm et al. |
| 2020/0124632 | A1 | 4/2020 | Hirami et al. |
| 2020/0363439 | A1* | 11/2020 | Sherrill ............ G01N 35/00712 |

FOREIGN PATENT DOCUMENTS

| | | | | |
|---|---|---|---|---|
| JP | 2004-61397 | A | 2/2004 | |
| JP | 2015-518572 | A | 7/2015 | |
| JP | 2021097833 | A * | 7/2021 | |
| WO | WO-2019152604 | A1 * | 8/2019 | ........ G01N 35/0099 |
| WO | 2019/044160 | A1 | 4/2020 | |

OTHER PUBLICATIONS

International Search Report of PCT/JP2021/003964 dated Apr. 20, 2021.

\* cited by examiner

[FIG. 1]
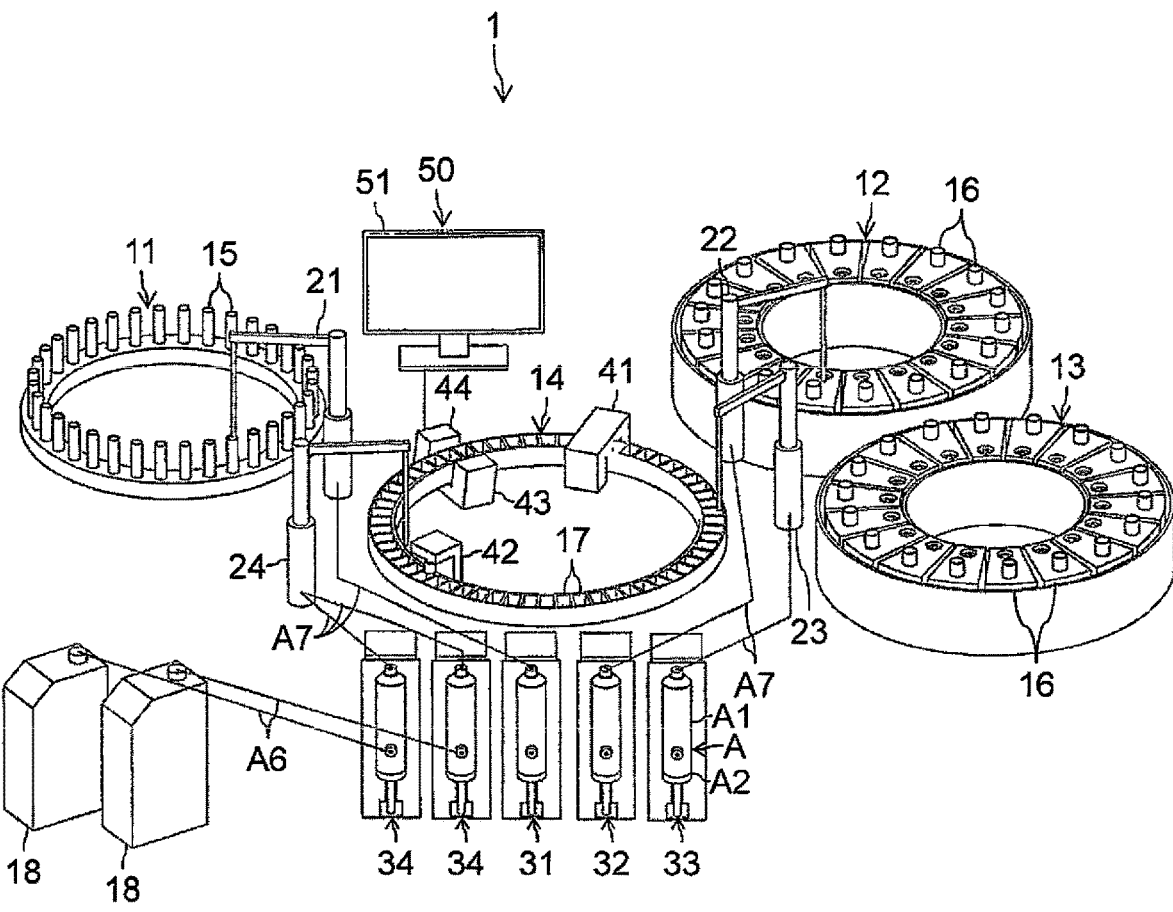

[FIG. 2]
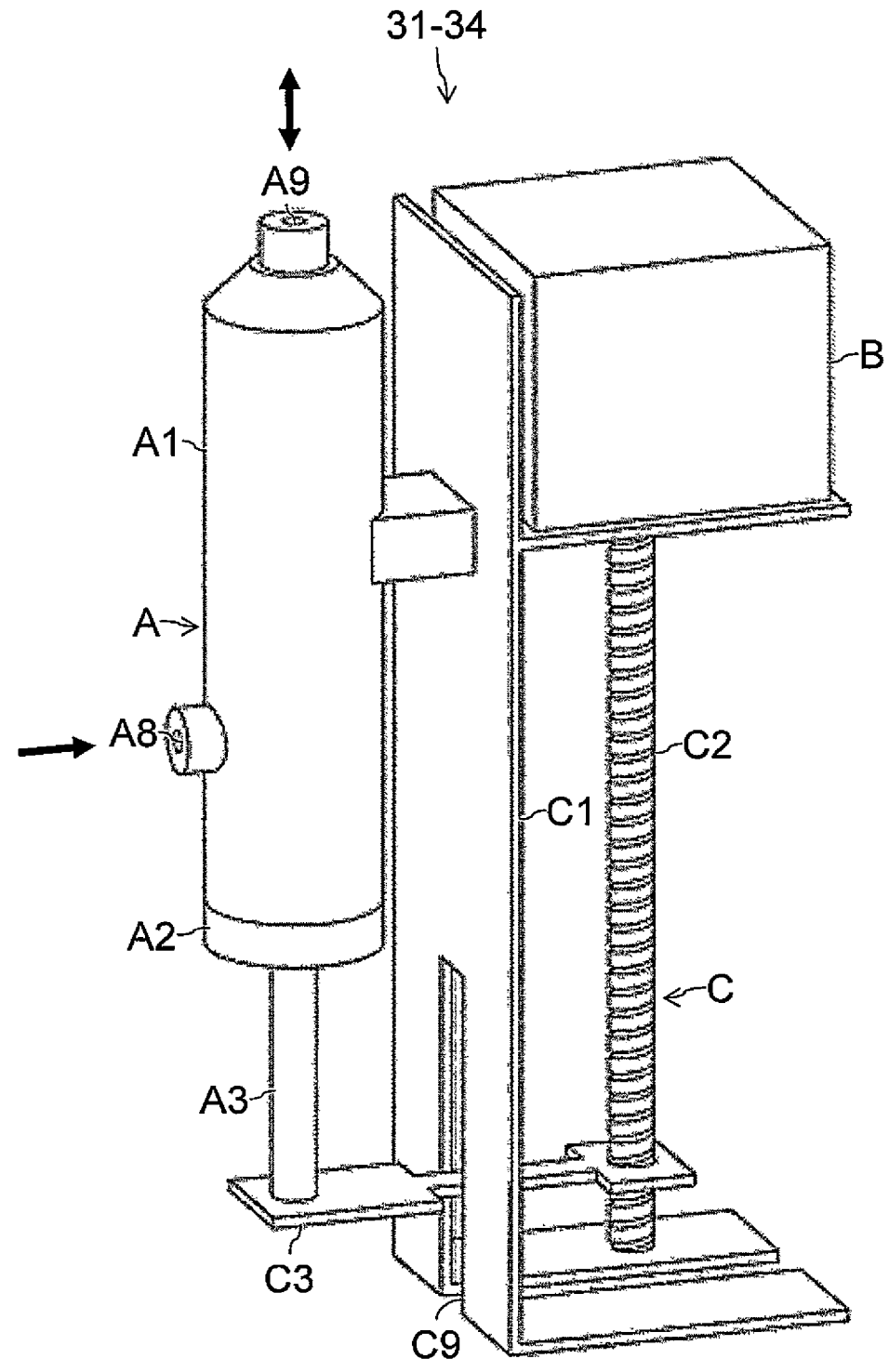

[FIG. 3]
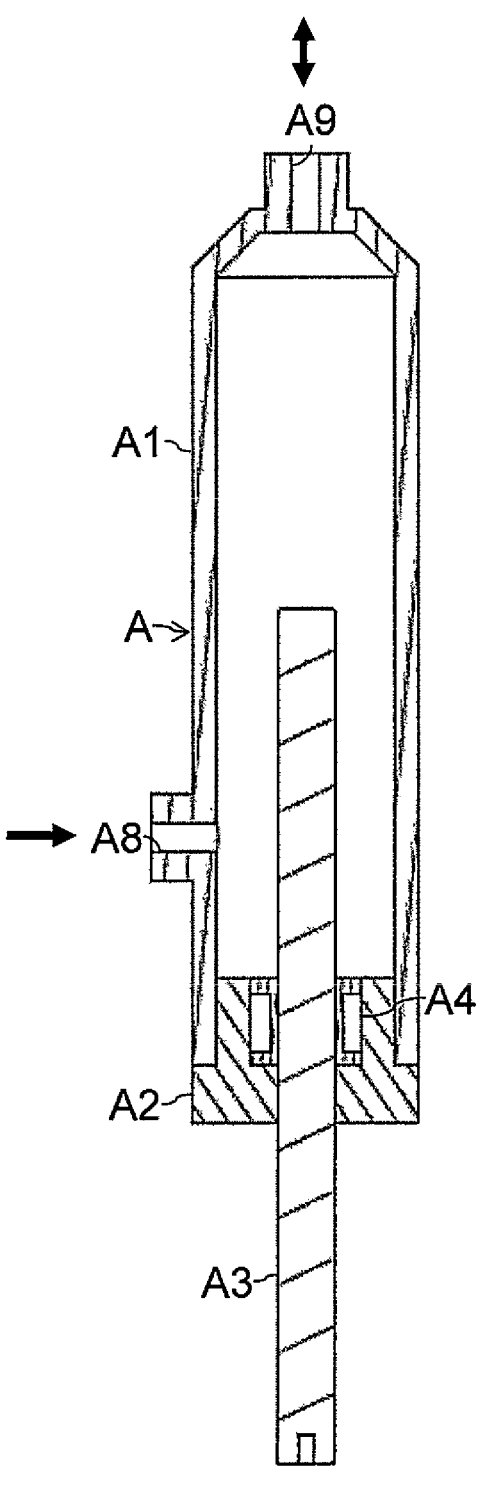

[FIG. 4]
| USE | AUTOMATIC ANALYZER X | | | | | AUTOMATIC ANALYZER Y | | | |
|---|---|---|---|---|---|---|---|---|---|
| | SAMPLE | REAGENT α | REAGENT β | DETERGENT | DETERGENT | SAMPLE | REAGENT | DETERGENT | DETERGENT |
| RANGE OF PLUNGER DIAMETER [mm] | 1.0-3.9 | 4.0-7.9 | 4.0-7.9 | 8.0- | 8.0- | 1.0-3.9 | 4.0-7.9 | 8.0- | 8.0- |
| SYRINGE TUBE | RED | BLUE | BLUE | GREEN | GREEN | RED | BLUE | GREEN | GREEN |
| PLUNGER DIAMETER [mm] | 1.0 | 5.0 | 6.0 | 10.0 | 10.0 | 1.5 | 5.0 | 10.0 | 10.0 |
| SYRINGE BASE | RED | BLUE | GRAY | GREEN | GREEN | YELLOW | BLUE | GREEN | GREEN |
[FIG. 5]
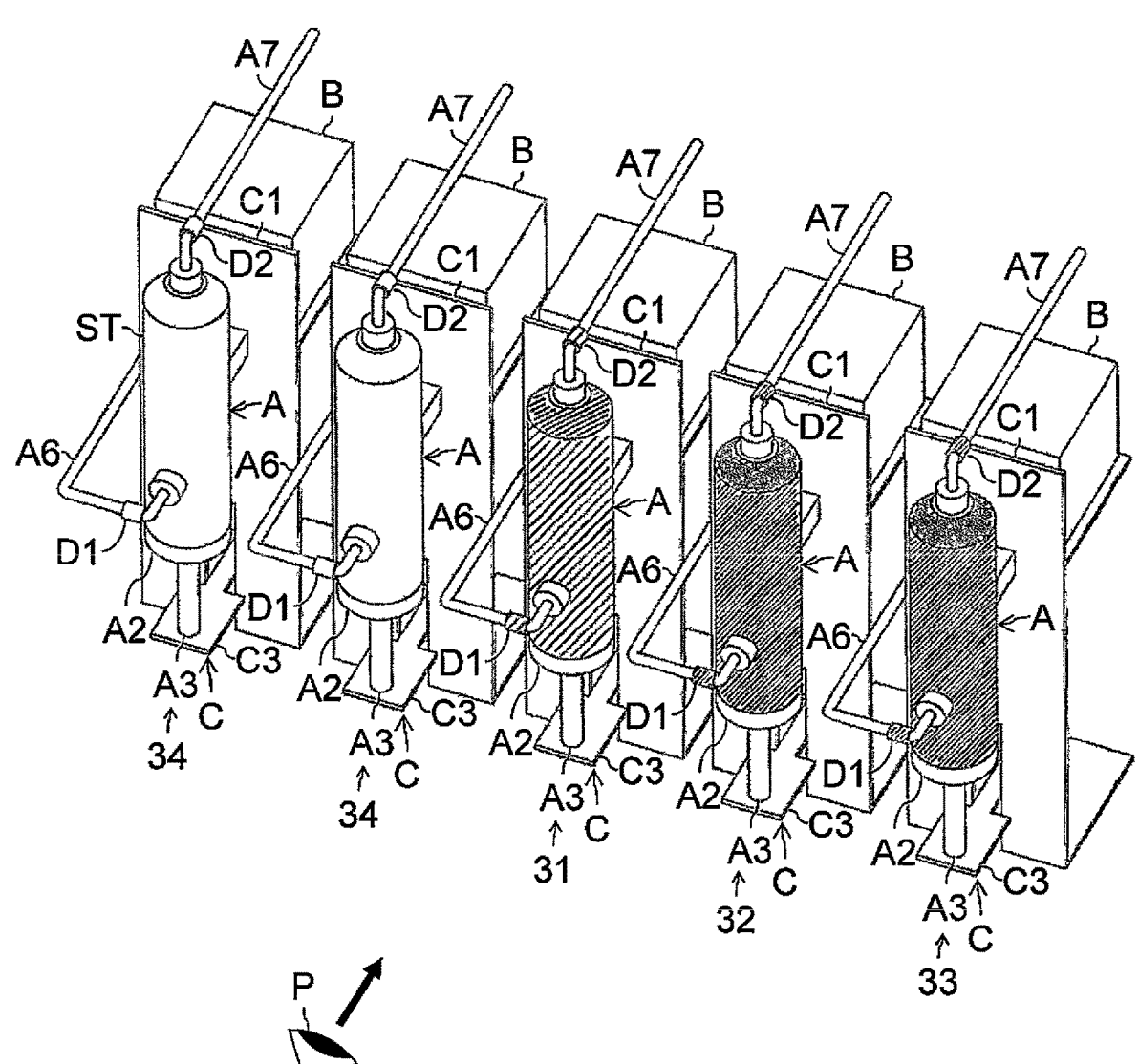

[FIG. 6]
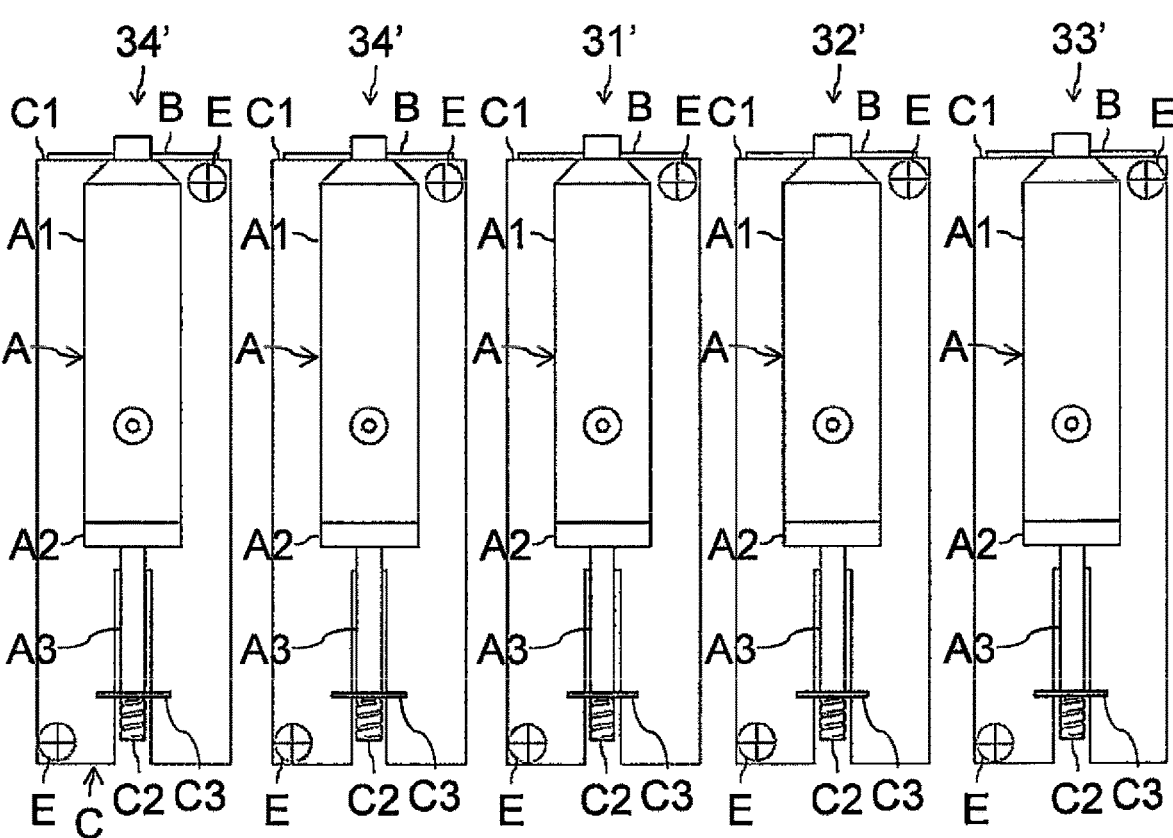

[FIG. 7]
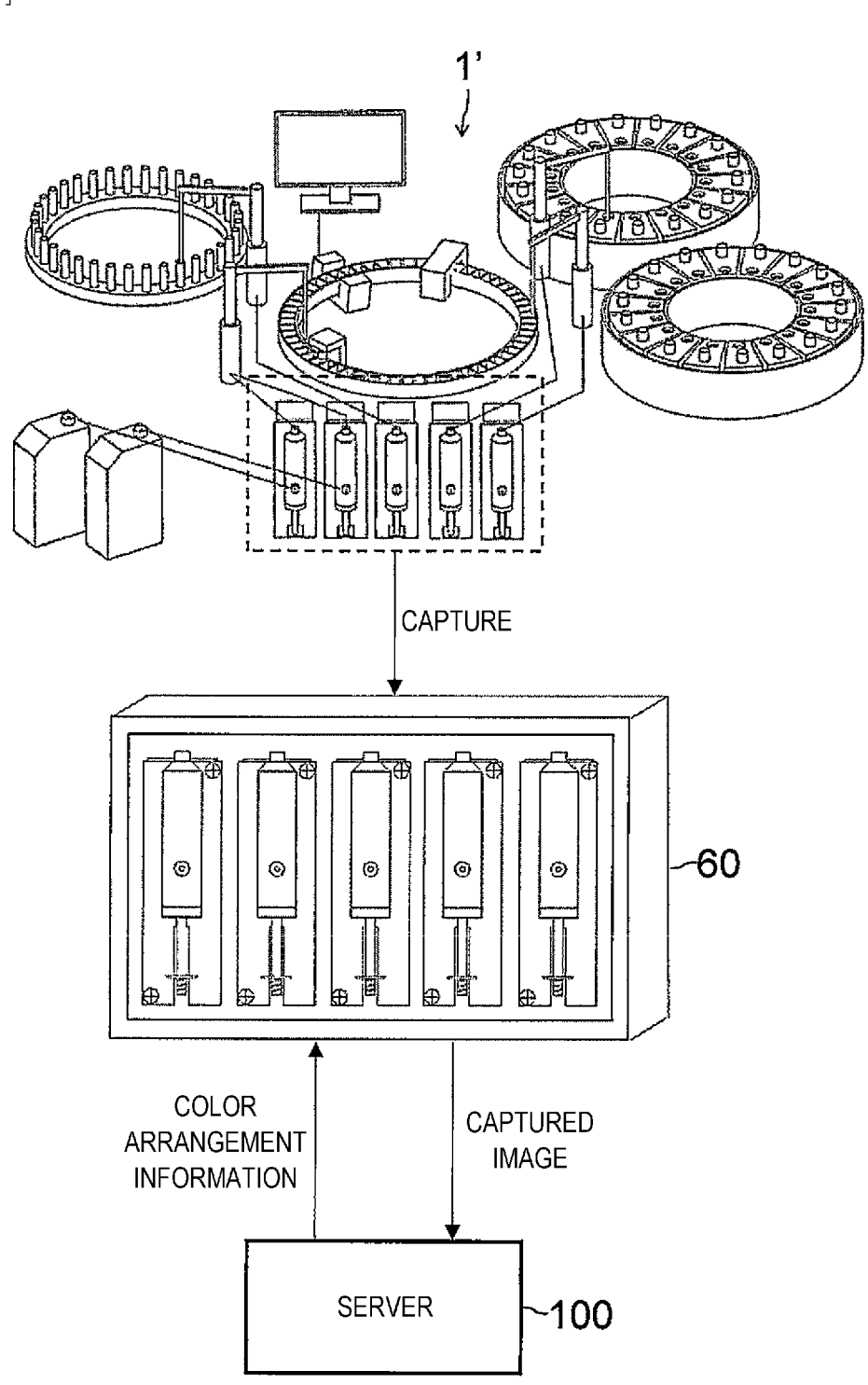
1'
CAPTURE
60
COLOR
ARRANGEMENT
INFORMATION
CAPTURED
IMAGE
SERVER          100

[FIG. 8]
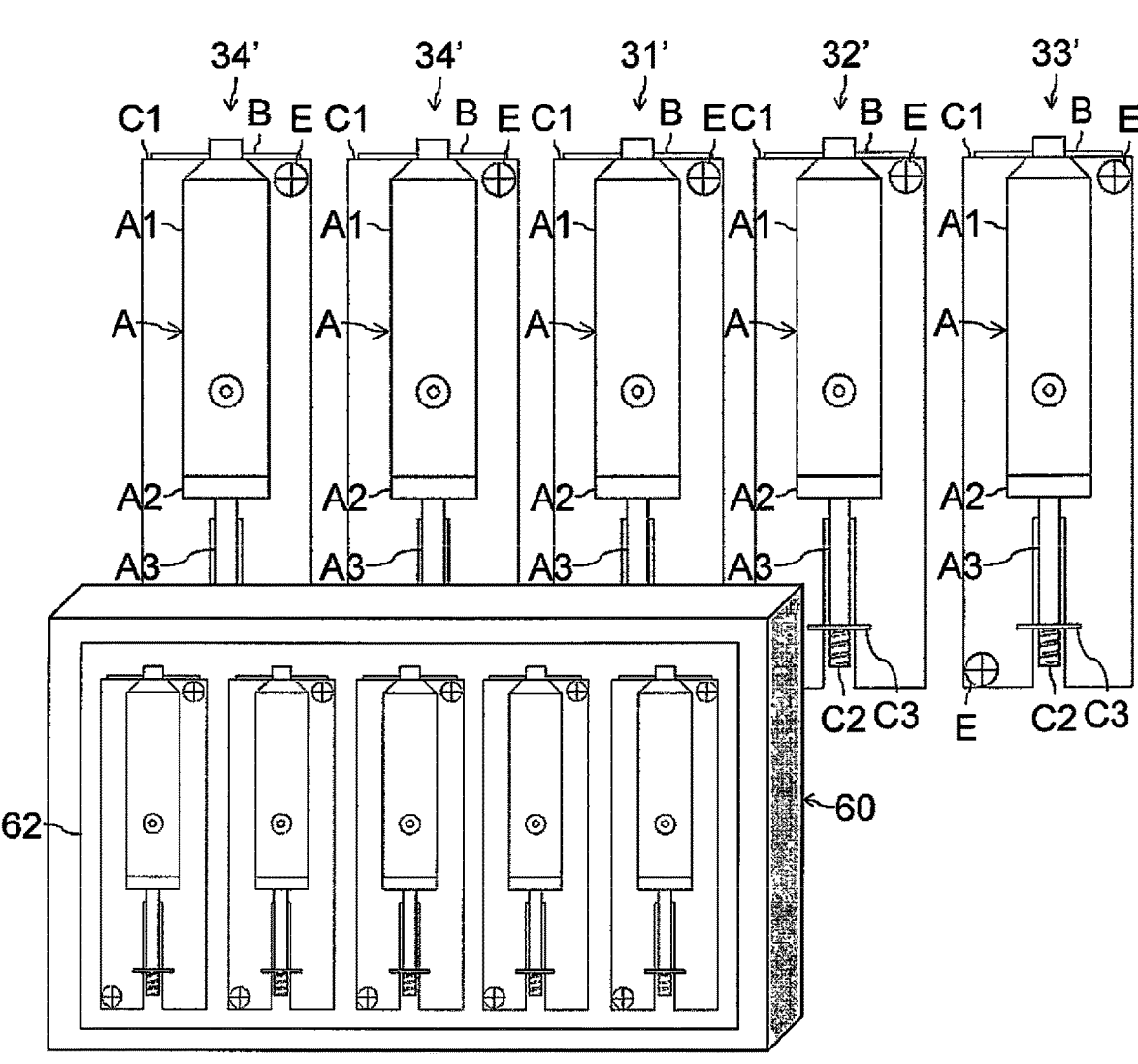

[FIG. 9]
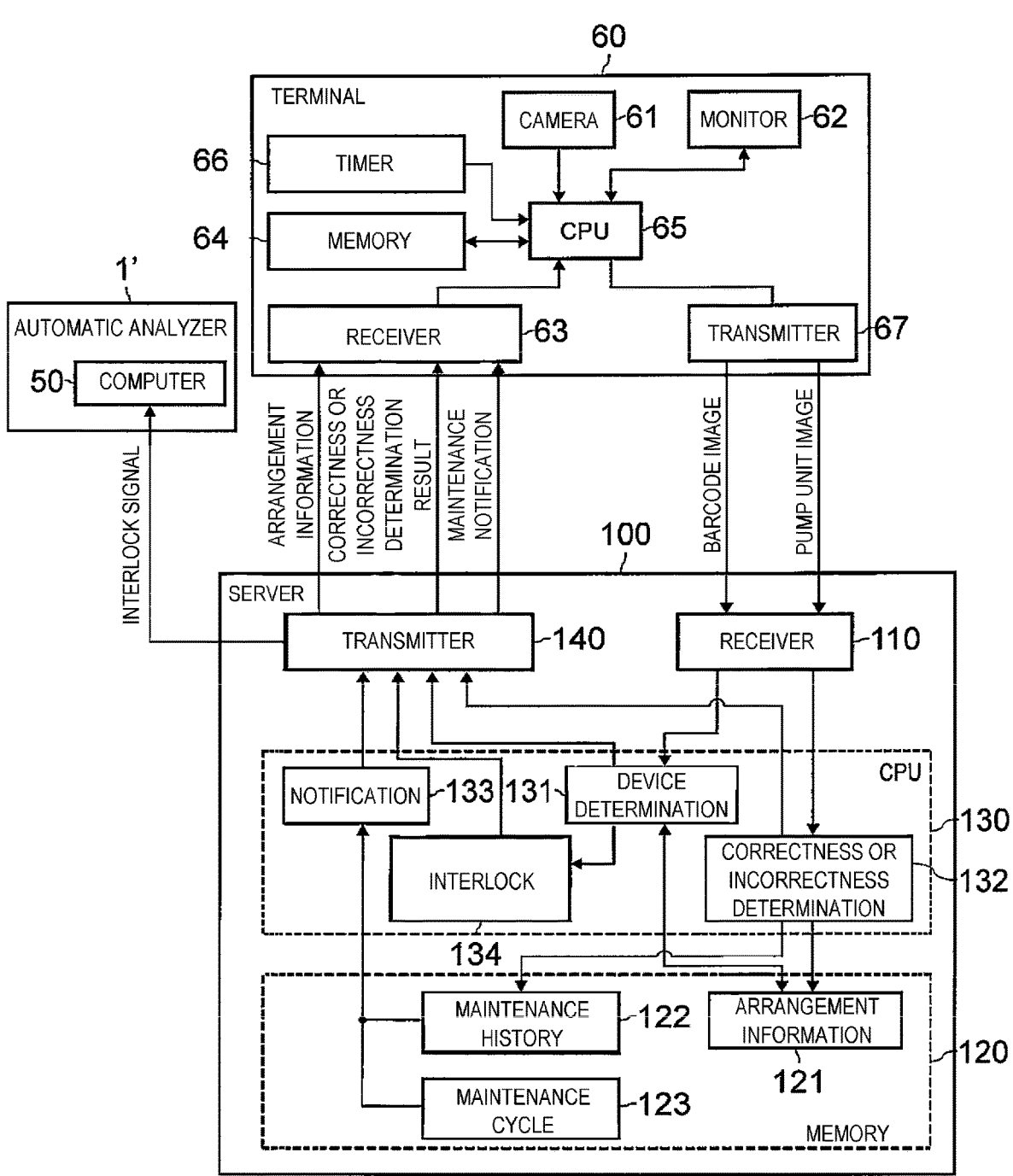

[FIG. 10]
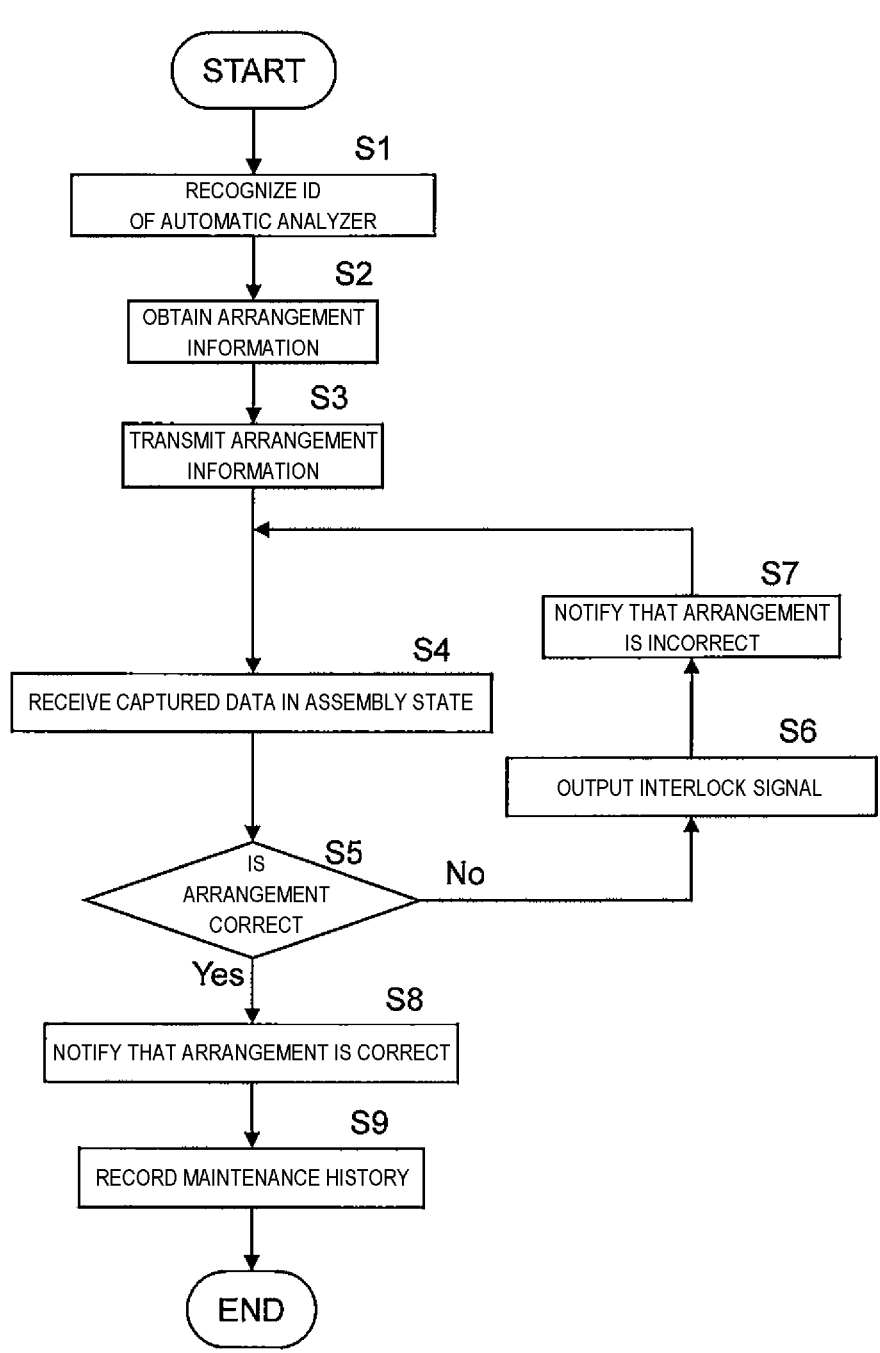

AUTOMATIC ANALYZER AND ASSEMBLY SUPPORT SYSTEM THEREOF

TECHNICAL FIELD

The present invention relates to an automatic analyzer that performs at least one of quantitative analysis and qualitative analysis of a biological sample, and more particularly, to an automatic analyzer including a syringe pump and an assembly support system thereof.

BACKGROUND ART

An automatic analyzer optically measures, by a photometric unit (for example, a spectrophotometer), a change in color tone and turbidity, light emission amount, and the like of a biological sample (hereinafter, abbreviated as a sample) such as serum or urine generated by a reaction with a reagent, and performs component analysis of the sample.

In order to cause the sample and the reagent to react with each other, it is necessary to dispense appropriate amounts of the sample and the reagent from containers, in which the sample and the reagent are respectively accommodated, into a reaction container. Therefore, the automatic analyzer is provided with a dispensing device for automatically aspirating the sample or the reagent (hereinafter, collectively referred to as a liquid) from the container, in which the sample or the reagent is accommodated, and discharging the sample or the reagent into the reaction container. In order to accurately dispense a variety of liquids having various properties, the dispensing device needs to use a component suitable for the corresponding liquid. Components constituting the dispensing device include a plunger, a syringe tube, an actuator, and the like (see PTL 1).

CITATION LIST

Patent Literature

PTL 1: JP-A-2004-61397

SUMMARY OF INVENTION

Technical Problem

In recent years, specifications, such as analysis accuracy, a dispensing amount, an analysis speed, and an installation space, required for a user have been diversified in the automatic analyzers. For example, a performance of a syringe pump is greatly related to the analysis accuracy. The automatic analyzer generally includes a plurality of syringe pumps, and these syringe pumps are appropriately connected to various dispensing units such as a sample dispensing unit, a reagent dispensing unit, and a cleaning liquid dispensing unit. Each syringe pump has a different plunger diameter depending on the application thereof.

The syringe pump described in PTL 1 is configured such that a plurality of sets of syringe pumps share one actuator, and when the actuator is driven, a plurality of plungers integrally operate. In the case of this configuration, since the plungers cannot be individually driven, the degree of freedom of an operation sequence for the liquid dispensing is low, which is disadvantageous from the viewpoint of improving the analysis speed and reducing the dispensing amount. On the other hand, when each syringe pump is configured to be driven by a dedicated actuator, the degree of freedom of the operation sequence is increased, which is advantageous in terms of the analysis speed and the dispensing amount.

However, since the syringe pump is attached to and detached from the automatic analyzer in association with maintenance, when the syringe pump and the actuator are in a one-to-one relationship, the similar syringe pump must be correctly combined with the corresponding actuator. Therefore, when the syringe pump is returned to the automatic analyzer after maintenance, if the syringe pump is mistakenly connected to a dispensing unit having a different combination, it is not possible to obtain an advantage that the syringe pump can be individually driven.

An object of the invention is to provide an automatic analyzer and an assembly support system capable of suppressing mistaking when syringe pumps having different combinations are connected to dispensing units.

Solution to Problem

In order to achieve the above object, the invention provides an automatic analyzer which includes: a plurality of dispensing units; and a plurality of pump units connected to the respective dispensing units. Each of the plurality of pump units includes: a syringe tube that has a liquid port at one end and an opening at another end; a syringe base that is attached to the opening at the other end of the syringe tube; a plunger that penetrates the syringe base and whose tip end is inserted inside the syringe tube; a seal piece that is configured to seal a gap between the plunger and the syringe base; an actuator; and a power transmission mechanism that connects the actuator and the plunger. Each plunger of the plurality of pump units has an individually set diameter and a different thickness. At least one of the syringe base and the syringe tube represents the diameter of the corresponding plunger in appearance.

Advantageous Effects of Invention

According to the invention, it is possible to suppress mistaking when syringe pumps having different combinations are connected to dispensing units.

BRIEF DESCRIPTION OF DRAWINGS

FIG. 1 is a schematic view of an example of an automatic analyzer according to a first embodiment of the invention.

FIG. 2 is an external view of a pump unit provided in the automatic analyzer according to the first embodiment of the invention.

FIG. 3 is a cross-sectional view of a syringe pump of the pump unit provided in the automatic analyzer according to the first embodiment of the invention, cut along a plane including a center line of a plunger.

FIG. 4 is a diagram showing an example of a color-coded table according to plunger diameters of a syringe tube and a syringe base in the automatic analyzer according to the first embodiment of the invention.

FIG. 5 is a diagram showing a mounting example of the pump units provided in the automatic analyzer according to the first embodiment of the invention.

FIG. 6 is an external view of a plurality of pump units provided in an automatic analyzer according to a second embodiment of the invention.

FIG. 7 is a schematic view of an assembly support system according to the second embodiment of the invention.

FIG. 8 is a diagram showing a state in which an image of the pump units shown in FIG. 6 is captured with a terminal.

FIG. 9 is a functional block diagram of the assembly support system shown in FIG. 7.

FIG. 10 is a flowchart showing an example of a series of processing procedures in the assembly support system according to the second embodiment of the invention.

DESCRIPTION OF EMBODIMENTS

Hereinafter, embodiments of the invention will be described with reference to the drawings.

Hereinafter, embodiments of the invention will be described in detail with reference to the drawings. In all the drawings for illustrating the present embodiment, components having the same function are denoted by the same reference numerals in principle.

First Embodiment

Automatic Analyzer

FIG. 1 is a schematic view of an example of an automatic analyzer according to a first embodiment of the invention. An automatic analyzer 1 shown in FIG. 1 includes components such as a plurality of disks 11 to 14, a plurality of dispensing units 21 to 24, a plurality of pump units 31 to 34, a stirring device 41, a container cleaning mechanism 42, a light source 43, a spectroscopic detector 44, and a computer 50. Each component is accommodated in or attached to a body of the automatic analyzer 1, and the body is not shown.

The stirring device 41 is a device that stirs a liquid inside each reaction container 17 (described later). The container cleaning mechanism 42 is a mechanism that cleans the reaction container 17. The light source 43 is a device that irradiates the stirred liquid inside the reaction container 17 with inspection light, and is disposed on an inner peripheral side of the ring-shaped reaction disk 14 in the present embodiment. The spectroscopic detector 44 is a device including a sensor that receives the inspection light transmitted through the reaction container 17, is disposed on an outer peripheral side of the ring-shaped reaction disk 14, and faces the light source 43 across the reaction disk 14. The computer 50 is a control device that controls an operation of each device of the automatic analyzer 1, and also has a function of detecting a specific biological component, a chemical substance, and the like contained in a sample based on a signal from the spectroscopic detector 44. The computer 50 can display and output an analysis result on a display 51 or print out the analysis result on a printer (not shown) according to an operation of a user.

Next, the disks 11 to 14, the dispensing units 21 to 24, and the pump units 31 to 34 will be sequentially described.
Disk The disk 11 is a type of transfer device that transfers a sample container 15 (for example, a blood collection tube) containing a sample. A plurality of the sample containers 15 can be annularly disposed on the disk 11 for the sample. The disk 11 is driven by an actuator (not shown) to rotate about a vertical axis. The operation of the actuator is controlled by a command from the computer 50, and for example, the target sample container 15 can be moved to an aspiration position of the dispensing unit 21.

The disks 12 and 13 are each a type of transfer device that transfers a reagent container 16 containing a reagent. Similarly to the disk 11 for the sample, each of the disks 12 and 13 for reagent can have a plurality of the reagent containers 16 annularly disposed therein, and is driven by an actuator (not shown) in response to a command from the computer 50 to rotate about a vertical axis. Accordingly, for example, the target reagent container 16 can be moved to the aspiration positions of the dispensing units 22 and 23.

Similarly to the disks 11 to 13, the disk 14 includes a plurality of the reaction containers 17 disposed in an annular shape, and is driven by an actuator (not shown) in response to a command from the computer 50 to rotate about a vertical axis. Accordingly, for example, the target reaction container 17 can be moved to a discharge position of the dispensing units 21 to 24, a stirring position of the stirring device 41, a cleaning position of the container cleaning mechanism 42, and an irradiation position of the light source 43 with the inspection light.
Dispensing Unit The dispensing unit 21 is a device that discharges and dispenses the sample aspirated from the sample container 15 into the reaction container 17. The dispensing unit 21 for the sample includes a probe (dispensing nozzle) extending downward from a tip end of an arm pivotable about a vertical axis. The arm is configured to pivot by one actuator (not shown) and move up and down by another actuator (not shown). The arm is pivoted to move the probe to the aspiration position, and the arm is lowered to insert the probe into the sample container 15, such that the sample can be aspirated by the probe. Thereafter, the arm is raised and pivoted to move the probe to the discharge position, and the arm is lowered to insert the probe into the reaction container 17, such that the sample can be dispensed.

The other dispensing units 22 to 24 have the same configuration as the dispensing unit 21. The dispensing units 22 and 23 are for a reagent, and the dispensing unit 24 is for a cleaning liquid. The dispensing unit 22 is configured to aspirate the reagent from the reagent container 16 of the disk 12 and dispense the reagent into the reaction container 17. The dispensing unit 23 is configured to aspirate the reagent from the reagent container 16 of the disk 13 and dispense the reagent into the reaction container 17. The dispensing unit 24 is configured to aspirate the cleaning liquid from a cleaning liquid container 18 and discharge the cleaning liquid to the reaction container 17.

In the following description, the sample, the reagent, and the cleaning liquid aspirated and discharged by the dispensing units 21 to 24 are collectively referred to as a "liquid".
Pump Unit The pump units 31 to 34 are devices that cause the probes of the respective dispensing units to aspirate the liquid and discharge the liquid from the probes, and are connected to the respective dispensing units. The pump unit 31 is for a sample, and is connected to the dispensing unit 21 for the sample to aspirate and discharge the sample via the probe. The pump units 32 and 33 are for a reagent. The pump unit 32 is connected to the dispensing unit 22 for the reagent, and the pump unit 33 is connected to the dispensing unit 23 for the reagent. The reagents are aspirated and discharged through probes, respectively. The pump unit 34 is for the cleaning liquid, and is connected to the dispensing unit 24 for the cleaning liquid to aspirate and discharge the cleaning liquid.

In the present embodiment, the pump units 31 to 34 are disposed side by side so as not to overlap each other when the automatic analyzer 1 is viewed from a specified position (for example, a viewpoint P in FIG. 5). For example, in a case where the pump units 31 to 34 are disposed in a front portion of the automatic analyzer 1, when a front cover of the automatic analyzer 1 is opened and the automatic analyzer 1 is viewed from the front, a layout is such that a syringe tube A1 and a syringe base A2 of each of the pump units 31 to 34 are viewed at the same time. As a specific example, in the present embodiment, a syringe pump A of each of the pump units 31 to 34 is attached to the automatic analyzer in a vertically extending posture, and the syringe pumps A are horizontally disposed in one row along the same plane (for example, a virtual plane parallel to the front cover) (FIG. 1). However, an arrangement example of the pump units is not limited thereto, and for example, the syringe pumps A of the respective pump units may be attached horizontally or disposed in a plurality of rows, and may be appropriately changed as long as all the pump units can be visually recognized at the same time from one viewpoint P.

In addition, the pump units 31 to 34 are collectively disposed for each application (a sample dispensing application, a reagent dispensing application, and a cleaning liquid dispensing application). In the present embodiment, a case where two pump units 34 for dispensing the cleaning liquid are disposed in a left side area, the pump units 32 and 33 for dispensing the reagent are disposed in a right side area, and the pump unit 31 for dispensing the sample is disposed in a center area is illustrated.

FIG. 2 is an external view of the pump units 31 to 34, and FIG. 3 is a cross-sectional view of the syringe pump cut along a plane including a center line of a plunger. Each of the pump units 31 to 34 includes the syringe pump A, an actuator B, and a power transmission mechanism C.

The syringe pump A includes the syringe tube A1, the syringe base A2, a plunger A3, and a seal piece A4 (FIG. 3).

The syringe tube A1 is a cylindrical component, is assembled to the automatic analyzer 1 in a vertically extending posture, has a liquid port A9 at one end (upper end in the present example), and has an opening on the other end (lower end in the present example). A cleaning liquid port A8 is provided at one position in a peripheral body portion of the syringe tube A1. The liquid port A9 is connected to the probe of the corresponding dispensing unit via a hose A7 (FIG. 1). The cleaning liquid port A8 is connected to the cleaning liquid container 18 (FIG. 1) via a hose A6 (FIG. 1). Although FIG. 1 shows a state in which only the pump unit 34 for the cleaning liquid is connected to the cleaning liquid container 18, the cleaning liquid ports of the pump units 31 to 33 are also connected to the cleaning liquid containers 18 (or other cleaning liquid containers). Electromagnetic valves (not shown) are provided in the middle of the hoses A6 and A7.

The syringe base A2 is a plug-shaped component, and is attached to the opening on the other end (lower end) of the syringe tube A1. A through hole through which the plunger A3 is inserted and to which the seal piece A4 is attached is formed in the center of the syringe base A2.

The plunger A3 is a cylindrical component, extends coaxially with the syringe tube A1, and passes through the seal piece A4 and the syringe base A2. A tip end side (upper side in the present example) of the plunger A3 is inserted into the syringe tube A1, and a base end side (lower side in the present example) of the plunger A3 protrudes to the outside of the syringe tube A1. A gap between the plunger A3 and the syringe base A2 is sealed by the seal piece A4. In addition, an outer diameter of the plunger A3 is smaller than an inner diameter of the syringe tube A1, and a gap is formed between an outer peripheral surface of the plunger A3 and an inner peripheral surface of the syringe tube A1.

The actuator B is a drive device that drives the syringe pump A, and is implemented by an electric motor or an assembly in which a speed reducer is combined with the electric motor. An operation of the actuator B is controlled by the computer 50.

The power transmission mechanism C connects the actuator B and the plunger A3, and transmits a power of the actuator B to the syringe pump A (plunger A3). The power transmission mechanism C includes a support C1, a screw shaft C2, and a bracket C3.

The support C1 is a component for fixing a pump unit to the automatic analyzer 1. In the present embodiment, the support C1 is formed of a plate bent in an L-shape. A slit C9 extending vertically is provided in a lower portion of the support C1. The syringe pump A and the actuator B are fixed to and supported by the support C1. In the present embodiment, a component of the syringe pump A fixed to the support C1 is the syringe tube A1, and the syringe base A2 may be fixed to the support C1.

The screw shaft C2 is connected to an output shaft (not shown) of the actuator B via a coupling (not shown), and extends downward from the actuator B in parallel with the plunger A3. The support C1 is interposed between the screw shaft C2 and the syringe pump A.

The bracket C3 is a component that connects the plunger A3 and the screw shaft C2, and passes through the slit C9 provided in the support C1. One end of the bracket C3 is fixed to a base end (a lower end in the present example) of the plunger A3. A screw hole is formed in the other end of the bracket C3, and the screw shaft C2 is screwed into the screw hole.

When the actuator B is driven, the screw shaft C2 is rotated, the bracket C3 is guided by the slit C9 by a thrust applied from the screw shaft C2 and is translated up and down, the plunger A3 enters and exits the syringe tube A1, and an inner volume of the syringe tube A1 is changed. By performing such an operation of the pump unit by closing the electromagnetic valve of the hose A6, the liquid is aspirated and discharged to the probe. By closing the electromagnetic valve of the hose A7 and driving the pump unit (pulling the plunger A3), a washing water is introduced into the syringe tube A1. An arrow in FIG. 2 indicate a flow direction of a liquid with respect to the syringe tube A1.

Identification Display of Plunger Diameter

Among the components of the pump unit, the syringe tube A1, the syringe base A2, the actuator B, and the power transmission mechanism C respectively have the same outer shapes among those used in the pump units 31 to 34. That is, the outer shape of the syringe tube A1 is common in the pump units 31 to 34, and the outer shape (excluding the inner diameter) of the syringe base A2 is also common in the pump units 31 to 34. In particular, the syringe tube A1, the actuator B, and the power transmission mechanism C (the support C1, the screw shaft C2, and the bracket C3) can respectively have the same shapes among those used in the pump units 31 to 34. Further, the actuator B and the power transmission mechanism C (the support C1, the screw shaft C2, and the bracket C3) can respectively have the same colors among those used in the pump units 31 to 34.

Meanwhile, diameters of the plungers A3 of the pump units 31 to 34 are individually set to have different thicknesses. The diameter of the plunger A3 is set according to the type of liquid to be aspirated by the syringe pump A formed of the plunger A3, and a diameter of one plunger is different from that of at least one of the other plungers.

An outer shape (outer diameter) of the syringe base A2 is common among the pump units 31 to 34, but a hole diameter (inner diameter) at a center where the seal piece A4 and the plunger A3 are fitted is different according to the diameter of the plunger A3. An inner diameter of the seal piece A4 naturally varies according to the diameter of the plunger A3.

In relation to this point, the syringe base A2 and the syringe tube A1 of the present embodiment represent the diameter of the corresponding plunger A3 (that is, the plungers A3 constituting the same syringe pump A) in appearance. Specifically, molding colors of the syringe base A2 and the syringe tube A1 are color-coded according to the diameter of the corresponding plunger. In particular, in the case of the present embodiment, the molding color of the syringe base A2 individually indicates the diameter of the corresponding plunger A3, and the molding color of the syringe tube A1 indicates the classification of the diameter of the corresponding plunger A3. That is, for the syringe base A2, the molding color and the plunger diameter correspond to each other in a one-to-one relationship, and the molding color is distinguished as long as the plunger diameter is different even if the plunger diameter is slightly different. On the other hand, for the syringe tube A1, under the classification defined in advance for a range of the plunger diameter, the molding colors of the syringe tubes A1 having different plunger diameters across the classification are different from each other, but the molding colors of the syringe tubes A1 belonging to the same classification are the same even when the plunger diameters are different from each other.

FIG. 4 is an example of a color-coded table according to plunger diameters of a syringe tube and a syringe base. In the example of FIG. 4, it is assumed that a plurality of types of reagents α and β are used in an automatic analyzer X, and it is assumed that one type of reagent is used in an automatic analyzer Y. According to the table, the range of the plunger diameter is classified such that the plunger for dispensing a sample has a diameter of 1.0 mm to 3.9 mm, the plunger for dispensing a reagent has a diameter of 4.0 mm to 7.9 mm, and the plunger for dispensing a cleaning liquid has a diameter of 8.0 mm or more. The automatic analyzer X uses a plunger having a diameter of 1.0 mm for dispensing a sample, a plunger having a diameter of 5.0 mm for dispensing a reagent α, a plunger having a diameter of 6.0 mm for dispensing a reagent β, and a plunger having a diameter of 10.0 mm for dispensing a cleaning liquid. The automatic analyzer Y uses a plunger having a diameter of 1.5 mm for dispensing a sample, a plunger having a diameter of 5.0 mm for dispensing a reagent, and a plunger having a diameter of 10.0 mm for dispensing a cleaning liquid.

In the automatic analyzers X and Y, all of the plungers used for dispensing the sample belong to a classification of 1.0 mm to 3.9 mm, and in both of the automatic analyzers X and Y, a red molding color indicating the appearance of the sample dispensing application is assigned to the syringe tubes. Meanwhile, since the diameters of the plungers used in the automatic analyzers X and Y are different, the molding colors of the syringe bases are different even in the same sample dispensing application, and red is assigned to the syringe base in the automatic analyzer X and yellow is assigned to the syringe base in the automatic analyzer Y.

Next, in the automatic analyzers X and Y, all of the plungers used for dispensing the reagent belong to a classification of 4.0 mm to 7.9 mm, and in both of the automatic analyzers X and Y, a blue molding color indicating the appearance of the reagent dispensing application is assigned to the syringe tubes. Meanwhile, the same blue color as that of the syringe tube is assigned to the syringe base as a display color of a plunger having a diameter of 5.0 mm used in both the automatic analyzers X and Y. However, since a plunger having a diameter of 6.0 mm is also used in the automatic analyzer X, gray is used as the molding color of the syringe base corresponding to the plunger having a diameter of 6.0 mm in order to distinguish the plunger having a diameter of 6.0 mm from the plunger having a diameter of 5.0 mm.

In addition, in the automatic analyzers X and Y, all of the plungers used for dispensing the cleaning liquid belong to a classification of 8.0 mm or more, and in both of the automatic analyzers X and Y, a green molding color indicating the appearance of the cleaning liquid dispensing application is assigned to the syringe tubes. For the cleaning liquid dispensing application, the diameters of the plungers used in the automatic analyzers X and Y are unified to 10.0 mm, and the green molding color, which is the same as that of the syringe tubes, is also assigned to the syringe bases.

The molding colors of the syringe tube and the syringe base are preferably the same color as long as the syringe tube and the syringe base are used in common. From this viewpoint, regarding the sample dispensing application, in the example of FIG. 4, a warm color (red, yellow) is assigned to the molding color of the syringe base, and red representing the warm color is assigned to the molding color of the syringe tube. The assignment of the warm color is considered to be a rational example because the warm color has a strong impressive relationship with blood, which is a representative example of a biological sample. In addition, regarding the reagent dispensing application, in the same example, a cold color (blue, gray) which is opposite to the warm color is assigned to the molding color of the syringe base, and blue which represents the cold color is assigned to the molding color of the syringe tube. Then, regarding the cleaning liquid dispensing application, in the same example, a neutral color (green) is assigned to the molding color of the syringe base, and green representing the neutral color is assigned to the molding color of the syringe tube.

FIG. 5 is a diagram showing a mounting example of the pump units according to the present embodiment. The molding colors of the syringe tube A1 and the syringe base A2 are color-coded for the automatic analyzer X in the table of FIG. 4. In each of the pump units 31 to 34, an identification band D1 is attached to a connection end portion of the hose A7 with the syringe pump, and an identification band D2 is attached to a connection end portion of the hose A6 with the syringe pump. Colors of the identification bands D1 and D2 correspond to the molding color of the syringe tube A1 or the syringe base A2 of the attached pump unit. In the same pump unit, the colors of the identification bands D1 and D2 may be unified, and in the present example, the color of the identification band D1 corresponds to the molding color of the syringe tube A1, and the color of the identification band D2 corresponds to the molding color of the syringe base A2. Therefore, regarding the pump unit 31 for the sample, the pump unit 32 for the reagent a, and the pump unit 34 for the cleaning liquid, the identification bands D1 and D2 have the same color, and regarding of the pump unit 33 for the reagent the identification bands D1 and D2 have the same color scheme but have different colors.

Maintenance of Pump Unit

During the operation of the automatic analyzer 1, in the syringe pump A, the seal piece A4 wears as the seal piece A4 rubs against the plunger A3. During maintenance of the pump units 31 to 34, the worn seal piece A4 is replaced with a new one by an operator such as a maintenance operator. Specifically, the syringe pump A is detached from the power transmission mechanism C of the pump unit, and the detached syringe pump A is disassembled into the syringe tube A1, the syringe base A2, the plunger A3, and the seal piece A4. Then, the syringe tube A1, the syringe base A2, the plunger A3, and the seal piece A4 are assembled by replacing the seal piece A4 with a new one, and the assembled syringe pump A is attached to the power transmission mechanism C of the pump unit.

When such disassembling and assembling operations are performed in parallel for a plurality of pump units, a human error, in which a combination of a syringe base and a syringe tube is mistaken or an assembled syringe pump is assembled to a different pump unit, is generally likely to occur.

Effects (1) In the present embodiment, since each of the plurality of pump units 31 to 34 includes the actuator B, the pump units 31 to 34 can be individually driven. Therefore, the degree of freedom of an operation sequence for liquid dispensing is high, and both improvement of an analysis speed and reducing of a dispensing amount are excellent.

(2) The diameters of the plungers corresponding to the syringe tube A1 and the syringe base A2 are represented by molding colors. The diameter of the plunger A3 differs depending on the type of the liquid to be dispensed, and only the shape of the seal piece A4 matches the shape of the plunger A3 having the corresponding diameter. The misassembly of the seal piece A4 and the plunger A3 is not likely to occur physically. In the present embodiment, the molding color of the syringe base A2 fitted to the seal piece A4 is different depending on the plunger A3, and the operator can recognize what dispensing application the currently assembled syringe pump A is by the color of the syringe base A2.

In addition, in the present embodiment, the syringe tube A1 is also color-coded by the classification of the plunger diameter (in the present example, equal to the application). Although the syringe tube A1 and the syringe base A2 are freely combined in shape, since the syringe tube A1 and the syringe base A2 are color-coded, mistaking is less likely to occur when the syringe tube A1 for the same application is attached to the syringe base A2. By attaching the syringe tube A1 for which the application is matched, it is easy to understand at a glance what the syringe pump is for with the syringe tube A1 having an exposed area larger than that of the syringe base A2. Since the operator can also recognize the pump unit to which the syringe pump A is to be assembled from the appearance of the syringe pump A, the syringe pump A can be smoothly assembled to the correct power transmission mechanisms C in combination. Therefore, it is possible to suppress mistaking when syringe pumps are connected to dispensing units having different combinations.

As described above, in the present embodiment, since the molding colors of both the syringe tube A1 and the syringe base A2 are color-coded according to the diameter of the corresponding plunger A3, it is possible to effectively suppress the misassembly of the syringe tube A1 and the syringe base A2. Furthermore, since the plunger diameter is obvious at a glance in the syringe tube A1 having a large exposed area, it is possible to effectively suppress misassembly between the syringe pump A and the dispensing unit. However, for example, even when only the molding color of the syringe base A2 is used, a display area is small, but the plunger diameter can be recognized by the appearance. From this viewpoint, the molding colors of the syringe tubes A1 may be unified without being color-coded.

(3) In the present embodiment, a case in which the syringe base A2 is finely color-coded in a one-to-one correspondence relationship with the plunger diameter, and the syringe tube A1 is color-coded in a classification of the plunger diameter has been exemplified. For example, when the variation of the plunger diameter used in the same application (sample dispensing application, reagent dispensing application, and the like) is increased, if the syringe tube A1 is also finely color-coded, it is possible to take time to find the syringe tube A1 to be combined as a pair with the syringe base A2. The same applies to the case of narrowing down a position where the assembled syringe pump A is to be assembled.

In this regard, the syringe tube A1 is roughly color-coded according to the application (classification of the plunger diameter), such that the syringe tube A1 to be combined as a pair with the syringe base A2 can be easily found. Also, in the case of assembling the assembled syringe pump A to the power transmission mechanism C, it is possible to use the color of the syringe tube A1 to roughly grasp the assembly position in an area, and further narrow down the assembly position in detail by the color of the syringe base A2. An example of the reagent β of the automatic analyzer X shown in the table of FIG. 4 will be described, since the syringe tube A1 is blue, in FIG. 5, it is possible to first narrow down candidates of the assembly position to the area on the right side where the pump units 32 and 33 for reagent dispensing application are disposed. After that, since the color of the syringe base A2 is gray, the assembly position can be alternatively specified in the pump unit 33. This advantage can be more effective as the number of pump units increases.

(4) Since the identification bands D1 and D2 are provided in the hoses A6 and A7, the operator can set the syringe pump A at a correct position by matching the colors of the identification bands D1 and D2, the syringe tube A1, and the syringe base A2. In this case, the operator does not need to remember the correspondence between the pump unit and the plunger diameter, and does not need to perform the operation while confirming the arrangement of the syringe pump A by an instruction manual and the like.

(5) The outer shapes of the syringe tube A1, the syringe base A2, the actuator B, and the power transmission mechanism C are unified among the pump units 31 to 34. In particular, for the syringe tube A1, the actuator B, and the power transmission mechanism C, components having exactly the same shape can be used in the pump units 31 to 34, and the manufacturing cost can be reduced by a large mass production effect.

(6) Since the pump units 31 to 34 are disposed side by side so as not to overlap with each other when viewed from a specified position, the syringe pump A is excellent in visibility, and it is also advantageous for confirming whether the assembly is correct or incorrect.

Second Embodiment

In the first embodiment, an example, in which the operator visually determines whether the assembly positions of the syringe tube A1 and the syringe base A2 (the component selection and the assembly positions of the syringe pump A) are correct or incorrect, has been described. Mistaking of components can be effectively suppressed by color-coding of the syringe tube A1, the syringe base A2, and the identification bands D1 and D2, but a human error may occur.

Therefore, an embodiment will be described in which occurrence of a human error is suppressed by using an assembly support system that instructs an assembly position of the syringe tube A1 or the syringe base A2 or determines whether the assembly position is correct or incorrect.

Automatic Analyzer

FIG. 6 is an external view of the pump units according to a second embodiment of the invention. Components similar to or corresponding to the components described in the first embodiment are denoted by the same reference numerals as those in the previous drawings in FIG. 6, and description thereof will be omitted. Pump units 31' to 34' shown in FIG. 6 are different from the pump units 31 to 34 of the first embodiment in that the pump units 31' to 34' of the present embodiment have optotypes E at respective corresponding positions. In other respects, the pump units 31' to 34' are the same as the pump units 31 to 34. The identification bands D1 and D2 (FIG. 5) can be omitted.

An area of the support C1 of the power transmission mechanism C as viewed from the front of the automatic analyzer 1 (as viewed from a position corresponding to the viewpoint P in FIG. 5) is larger than an area of the syringe pump A. When viewed from the front (when viewed from the position corresponding to the viewpoint P in FIG. 5), the support C1 located on the back side of the syringe pump A is seen to protrude from the syringe pump A. In the present embodiment, the optotypes E described above are provided at corner portions (two diagonal corners in the present example) of a front surface (a surface facing the viewpoint P on a surface on the syringe pump A side) of the support C1. The optotypes E are marks serving as references for recognizing target components (the syringe tube A1 and the syringe base A2) on captured images of the pump units 31' to 34'. Display positions of the optotypes E belong to a region that can be seen to protrude from the syringe pump A described above, and are configured such that the syringe pump A (the syringe tube A1 and the syringe base A2) and the optotypes E can be seen at the same time in a specified positional relationship when viewed from the front (the viewpoint P).

Overview of Assembly Support System

FIG. 7 is a schematic view of the assembly support system according to the present embodiment. The system shown in FIG. 7 includes at least one automatic analyzer 1', a terminal 60, and a server 100.

An ID display (not shown) is attached or drawn on an outer wall surface of the automatic analyzer 1'. A barcode is used as the ID display in the present embodiment, and a registration ID of the automatic analyzer 1' is recognized by capturing the barcode using the terminal 60. A code other than the barcode can be used as the ID display, or a character string can be used instead of the code, and the registration ID can be recognized by recognizing the character from the captured image. In addition, the ID display can be disposed at a position where the ID display appears in the captured image together with the pump units 31' to 34' when the pump units 31' to 34' are captured by the terminal 60 from the viewpoint P. In this case, there is an advantage that an ID of the automatic analyzer 1' can be identified even by an image for determining whether the assembly position of the syringe tube A1 or the syringe base A2 is correct or incorrect. If such a function is not necessary, the ID display can be disposed at a position where the ID display does not appear in the image together with the pump units 31' to 34'.

In other respects, a hardware configuration of the automatic analyzer 1' is the same as that of the automatic analyzer 1 of the first embodiment except for the presence or absence of the optotypes E described with reference to FIG. 6.

The terminal 60 has a capturing function and includes a camera 61 (FIG. 9) and a monitor 62 (FIG. 9). As the terminal 60, a mobile terminal such as a smartphone, a tablet PC, or a notebook PC can be suitably used, and the terminal 60 can be provided as a dedicated terminal in the automatic analyzer 1'. The mobile terminal may be a general-purpose product in which a predetermined program is installed, or may be configured as a dedicated product that executes only the application described in the present embodiment.

The server 100 recognizes the ID of the automatic analyzer 1' from the captured image of the ID display described above. Then, the server 100 has a function of transmitting, to the terminal 60, registration data regarding the arrangement and the molding colors of the syringe tubes A1 and the syringe bases A2 of the syringe pumps A of the pump units 31' to 34', and causing the terminal 60 to display and output an assembly instruction screen on the monitor 62. The operator can assemble each syringe pump A and assemble the syringe pump A at a predetermined position according to the assembly instruction screen displayed on the monitor 62 of the terminal 60.

In addition, the server 100 is programmed so as to be able to determine whether the assembly positions of the syringe tubes A1 and the syringe bases A2 are correct or incorrect based on the image of the pump units 31' to 34' captured by the camera 61 from the front as shown in FIG. 8. The operator can confirm a determination result returned from the server 100 on the monitor 62 of the terminal 60.

Further, the server 100 has a function of outputting an interlock signal for prohibiting a dispensing operation to the computer 50 of the corresponding automatic analyzer 1' when there is an error in the assembly positions of the syringe tube A1 and the syringe base A2. Upon receiving the interlock signal, the computer 50 stops outputting any command signals to the actuators B of at least the pump units 31' to 34' regardless of whether there is a dispensing order. Interlocking of the dispensing operation is released when the computer 50 receives an interlock release signal from the server 100.

Configuration Example of Assembly Support System

FIG. 9 is a functional block diagram of the assembly support system. Configurations of the terminal 60 and the server 100 will be described with reference to FIG. 9.

The terminal 60 includes, as typical components, a receiver 63, a memory 64, a processor 65, a timer 66, a transmitter 67, and the like, in addition to the camera 61 and the monitor 62. The receiver 63 receives data from the server 100. The received data includes arrangement information (assembly instruction screen) of the syringe tube A1 and the syringe base A2, a correctness or incorrectness determination result of the assembly position, maintenance notification, and the like. In the memory 64, a program to be executed by the processor 65, data necessary for executing the program, data received from the server 100, data of the image captured by the camera 61, and the like are recorded. Data of the capturing date and time measured by the timer 66 is added to the captured image. The processor 65 is, for example, a CPU, and may be replaced with various devices having the same calculation function, such as a microprocessor. The terminal 60 controls the camera 61 and the monitor 62 by the processor 65, and processes data exchanged with the server 100. The transmitter 67 transmits data to the server 100. The data to be transmitted includes an identification display of the automatic analyzer 1' captured by the camera 61, an image (including capturing date and time) of the pump units 31' to 34', and the like.

The server 100 includes, as typical components, a receiver 110, a memory 120, a processor 130, and a transmitter 140. The receiver 110 receives data from the terminal 60. The received data includes the identification display of the automatic analyzer 1' captured by the camera 61, the image (including capturing date and time) of the pump units 31' to 34', and the like. The transmitter 140 transmits data to the terminal 60. The data to be transmitted includes the arrangement information (assembly instruction screen) of the syringe tube A1 and the syringe base A2, the correctness or incorrectness determination result of the assembly position, the maintenance notification, and the like. In addition, the transmitter 140 is also connected to the automatic analyzer 1', and can output an interlock signal (described later) and a release signal thereof to the automatic analyzer 1'.

In the memory 120, a program to be executed by the processor 130, data necessary for executing the program, data received from the terminal 60, and the like are recorded. As the data necessary for executing the program, an arrangement information table 121, a maintenance history 122, a maintenance cycle table 123, and the like are registered.

The arrangement information table 121 is data in which the arrangement and the molding colors (appearances) of the syringe tube A1 and the syringe base A2 of each of the pump units 31' to 34' are collected for each ID of the automatic analyzer 1'.

The maintenance history 122 is, for example, a history of a date and time of good determination (execution of step S8 in FIG. 10) made by correctness or incorrectness determination of the assembly position of the syringe tube A1 or the syringe base A2 of the automatic analyzer 1'.

The maintenance cycle table 123 is data in which maintenance intervals of the pump units 31' to 34' set from the viewpoint of wear of the seal pieces A4 are collected for each ID of the automatic analyzer 1'.

The processor 130 is, for example, a CPU, and may be replaced with various devices having the same calculation function, such as a microprocessor. The processor 130 has a function of executing each processing of device determination 131, correctness or incorrectness determination 132, notification 133, and interlock 134 according to the program stored in the memory 120.

The device determination 131 is processing of determining the ID of the automatic analyzer 1', reading registration data of the arrangement and the molding colors of the syringe tube A1 and the syringe base A2 of the automatic analyzer 1' from the arrangement information table 121, and outputting the registration data to the terminal 60 via the transmitter 140. Registration information thus transmitted from the server 100 is received by the terminal 60, and the registration information as, for example, the assembly instruction screen is displayed on and output to the monitor 62 by the processor 65 in the terminal 60.

The correctness or incorrectness determination 132 is processing of collating the captured image received from the terminal 60 with the registration data of the arrangement information table 121 for the pump units 31' to 34' in a state in which the syringe pumps A are assembled, and performing the correctness or incorrectness determination of the assembly positions of the syringe tubes A1 and the syringe bases A2. The result of the correctness or incorrectness determination is transmitted to the terminal 60 by the transmitter. In the terminal 60, the result of the correctness or incorrectness determination is displayed on and output to the monitor 62 by the processor 65 based on the received data. When an error is included in the assembly positions of the syringe tube A1 and the syringe base A2, the terminal 60 is also notified of detailed information of the error.

The notification 133 is processing of calculating a next maintenance time for the automatic analyzer 1' and notifying the terminal 60 of the next maintenance time via the transmitter 140. The next maintenance time is calculated by adding a maintenance cycle of the automatic analyzer 1' read from the maintenance cycle table 123 to the latest (that is, the most recent) maintenance date and time recorded in the maintenance history 122 regarding the automatic analyzer 1'. A timing of the notification can be set and changed as appropriate, and may be, for example, during execution of the maintenance (execution of step S8 in FIG. 10), at the time of arrival of the next maintenance time, or before a setting period of the next maintenance time. In the terminal 60, the notification received from the server 100 is displayed on and output to the monitor 62 by the processor 65.

The interlock 134 is processing of outputting the interlock signal for prohibiting the dispensing operation to the computer 50 of the automatic analyzer 1' when there is an error in the assembly positions of the syringe tube A1 and the syringe base A2 of the automatic analyzer 1'. In the automatic analyzer 1', the dispensing operation of the automatic analyzer 1' is prohibited by the computer 50 according to the received interlock signal. The signal for releasing the interlock is output from the server 100 to the computer 50 when an error in the assembly positions of the syringe tube A1 and the syringe base A2 is corrected.

Processing Procedure

FIG. 10 is a flowchart showing an example of a series of processing procedures performed by the server 100. Hereinafter, the processing procedures executed by the server 100 will be described with reference to FIG. 10.

Step S1

When the seal pieces A4 (FIG. 3) of the pump units 31' to 34' are replaced during maintenance, the operator starts a predetermined program of the terminal 60, captures an image of the ID display of the automatic analyzer 1' by the terminal 60, and transmits the captured image to the server 100. When the captured image transmitted from the terminal 60 is received by the receiver 110 in this way, the server 100 starts the flow of FIG. 10, and first, as step S1, recognizes the ID of the automatic analyzer 1' from the ID display shown in the captured image.

Step S2

When the procedure is shifted to step S2, the server 100 obtains, based on the ID recognized in step S1, data of an appropriate assembly state of each syringe pump A of the pump units 31' to 34' of the automatic analyzer 1' from the arrangement information table 121 recorded in the memory 20. The obtained arrangement data includes information on a position and a molding color registered in advance for each syringe tube A1 of the pump units 31' to 34' of the automatic analyzer 1', and information on a position and a molding color registered similarly for each syringe base A2.

Step S3

In subsequent step S3, the server 100 transmits the data of the appropriate assembly state of each syringe pump A of the pump units 31' to 34' of the automatic analyzer 1' obtained in step S2 from the transmitter 140 to the terminal 60. Accordingly, the assembly instruction screen is displayed on the monitor 62 of the terminal 60, and the operator replaces the seal piece A4 of each disassembled syringe pump A according to the display of the monitor 62, and assembles the syringe pump A again. Then, each of the assembled syringe pumps A is assembled to a respective one of the power transmission mechanisms C according to the display of the monitor 62. The assembly instruction screen displayed on the monitor 62 may be in the form of a sentence or a table, and can be easily seen when the assembly instruction screen is in the form of a color drawing representing the assembly state (or in the form of a color drawing to which color text information is added).

Step S4

When each of the syringe pumps A is attached to a respective one of the power transmission mechanisms C, the operator captures an image of the entire pump units 31' to 34' into the angle of view from the viewpoint P using the terminal 60, and transmits the captured image of the pump units 31' to 34' to the server 100. In step S4, the server 100 receives, by the receiver 110, the captured image of the pump units 31' to 34' transmitted from the terminal 60.

Step S5

When the procedure is shifted to step S5, the server 100 recognizes each of the syringe tubes A1 and the syringe bases A2 of the pump units 31' to 34' based on the respective optotypes E on the captured image received in step S4, and identifies the colors of the syringe tubes A1 and the syringe bases A2. Thereafter, the server 100 determines whether the identified colors of the syringe tubes A1 and the syringe bases A2 match the appropriate data obtained in step S2. When the colors of the syringe tubes A1 and the syringe bases A2 completely match the appropriate data and the assembly positions of the syringe tubes A1 and the syringe bases A2 are appropriate, the server 100 shifts the procedure from step S5 to step S8. When the colors of the syringe tubes A1 and the syringe bases A2 do not match the appropriate data and at least a part of the assembly positions of the syringe tubes A1 and the syringe bases A2 are incorrect, the server 100 shifts the procedure from step S5 to step S6.

Step S6

When the procedure is shifted to step S6, the server 100 outputs the interlock signal to the automatic analyzer 1', and prohibits the dispensing operation of the automatic analyzer 1' such that the dispensing operation is not executed in a state where the pump units 31' to 34' are not appropriately assembled.

Step S7

In the subsequent step S7, the server 100 notifies the terminal 60 that there is an error in the assembly positions of the syringe tube A1 or the syringe base A2 based on the result of the correctness or incorrectness determination in step S5, and returns the procedure to step S4. The notification content is displayed on the monitor 62 of the terminal 60. This notification includes detailed information of the error. The detailed information of the error is, for example, information on a part (the syringe tube A1 and/or the syringe base A2) whose assembly position is incorrect, and information on a correct assembly position of the part. The information on the position where the incorrect part is assembled and the information on the correct part to be assembled at the position may be displayed as the detailed information of the error. The operator corrects the error of the assembly position of the syringe tube A1 or the syringe base A2 according to the display of the monitor 62. When the error of the assembly position of the syringe tube A1 or the syringe base A2 is corrected, the operator captures an image of the entire pump units 31' to 34' into the angle of view from the viewpoint P using the terminal 60, and transmits the captured image of the pump units 31' to 34' to the server 100. The server 100 receives the captured image and executes the procedures of steps S4 and S5 again.

Step S8

When the assembly positions of each syringe tube A1 and each syringe base A2 are appropriate in step S5, the server 100 shifts the procedure to step S8, and notifies the terminal 60 that the assembly positions of all the syringe tubes A1 and the syringe bases A2 are appropriate. The notification content is displayed on the monitor 62 of the terminal 60. In addition, when an interlock is established in the automatic analyzer 1', the server 100 outputs an interlock release signal to the automatic analyzer 1'.

Step S9

In subsequent step S9, the server 100 records the date and time (for example, the date and time of the notification in step S8) when the replacement of the seal piece A4 is appropriately completed in the maintenance history 122, and ends the flow of FIG. 10.

Although omitted in FIG. 10, the server 100 notifies, at a specified timing, the terminal 60 of the next maintenance time calculated based on the latest maintenance date and time recorded in the maintenance history 122 in step S9.

Effects (1) In the present embodiment, since the syringe tube A1 and the syringe base A2 are similarly color-coded, the same effects as those of the first embodiment can be obtained.

(2) In addition, in the present embodiment, the optotype E is displayed on each of the pump units 31' to 34'. Accordingly, when the color information of the syringe tubes A1 and the syringe bases A2 of the pump units 31' to 34' is obtained by image processing, the syringe tubes A1 and the syringe bases A2 can be recognized with high accuracy based on the optotypes E, and high recognition accuracy can be secured for the color information.

(3) In addition, information on the correct arrangement and the colors of the syringe tubes A1 and the syringe bases A2 of the pump units 31' to 34' of the automatic analyzer 1' is registered in advance in the memory 120. The information on the correct arrangement and the colors of the syringe tubes A1 and the syringe bases A2 can be called when the syringe pumps A are disassembled and assembled with the replacement of the seal pieces A4 for the pump units 31' to 34' of the automatic analyzer 1', and can be confirmed as an assembly instruction screen on the monitor 62. Accordingly, each of the syringe pumps A can be disassembled and assembled without hesitation according to the display of the monitor 62, and high working efficiency can be ensured.

(4) The information on the correct arrangement and the colors of the syringe tube A1 and the syringe base A2 can also be used for determining whether the assembly positions of the syringe tube A1 and the syringe base A2 are correct or incorrect by collating the captured image of the pump units 31' to 34' after the syringe pumps A are assembled. In this way, by making use of the image processing to systematically determine whether the assembly positions of the syringe tube Al and the syringe base A2 are correct or incorrect, it is possible to prevent an error in the assembly positions of the syringe tube A1 and the syringe base A2 due to a human error.

(5) Further, in the present embodiment, when there is an error as a result of the systematical determination of whether the assembly positions of the syringe tube A1 and the syringe base A2 are correct or incorrect, the dispensing operation of the automatic analyzer 1' is prohibited. Accordingly, it is possible to prevent erroneous assembly of the syringe pump A from adversely affecting the analysis result.

(6) In addition, by notifying the next maintenance date and time, it is possible to contribute to prevention of deterioration in dispensing accuracy due to wear of the seal piece A4.

(7) As described in the first embodiment, the color-coding may be performed on either the syringe tube A1 or the syringe base A2, and in the present embodiment, since the syringe tube A1 having a large exposed area is also color-coded, it is advantageous in accurately recognizing the color on the image.

(Modification)

In the two embodiments described above, a configuration in which both the syringe base A2 and the syringe tube A1 are color-coded has been described as an example. However, when the plunger diameter is represented by the appearance of the syringe pump A, as described above, only one of the syringe tube A1 and the syringe base A2 can be color-coded according to the plunger diameter. In this case as well, a certain effect can be expected.

In addition, when the syringe tube A1 and the syringe base A2 are color-coded, the invention is not limited to the example in which the plunger diameter is distinguished by the molding color of the syringe tube A1 and the like, and the syringe tube A1 may be color-coded by, for example, a seal attached to the syringe tube A1 and the like, a band attached to the syringe tube A1 and the like, or painting of the syringe tube A1 and the like. Further, in order to represent the plunger diameter by the appearance of the syringe pump A without changing the size or shape of the syringe pump A, the invention is not limited to the color-coding of the components, and for example, an example in which the plunger diameter is expressed in the syringe tube A1 and the syringe base A2 by laser printing may be considered.

In addition, in the second embodiment, only one automatic analyzer 1' to be managed by the server 100 is shown in FIGS. 7 and 9, and it is needless to say that a plurality of or a plurality of types of automatic analyzers can be managed by one server 100. When there are two or more automatic analyzers having different pump unit arrangement in the same facility, an ID of each automatic analyzer and arrangement information corresponding thereto may be registered in the arrangement information table 121 of the memory 120, and the arrangement information may be called according to the ID. The same applies to the maintenance history 122 and the maintenance cycle table 123.

In addition, in the second embodiment, the case where the barcode is used as the ID display of the automatic analyzer 1' has been described as an example, and another type of ID display may be used. In addition, the invention is not limited to the example in which the ID of the automatic analyzer 1' is recognized by an image, and for example, a plurality of automatic analyzers 1' may be registered in the terminal 60, any one of the automatic analyzers 1' may be selected by the terminal 60 and the corresponding arrangement information may be called.

In addition, in the second embodiment, the system, in which the server 100 and the terminal 60 cooperate with each other to execute the processing of the instruction of the assembly position, the correctness or incorrectness determination, and the various types of notification, has been described as an example, but a configuration, in which a series of processing can be executed only by the terminal 60 as long as the calculation capability of the terminal 60 is allowed, can be used. In this case, information stored in the memory 120 of the server 100 may be recorded in the memory 64 of the terminal 60, and a function executed by the processor 130 may be executed by the processor 65 of the terminal 60.

In addition, in the second embodiment, the two optotypes E provided in each of the pump units 31' to 34' are the same, and the optotypes E may be changed for each pump unit. In the same pump unit, the two optotypes E may be different from each other. In addition, one optotype E may be provided for each pump unit. Further, the syringe tube A1 and the syringe base A2 may be recognized by the shape from the captured image without using the optotype.

REFERENCE SIGNS LIST 1, 1': automatic analyzer
21 to 24: dispensing unit
31 to 34: pump unit
62: monitor
64: memory
65: processor
120: memory
130: processor
A1: syringe tube
A2: syringe base
A3: plunger
A4: seal piece
A6, A7: hose
A9: liquid port
B: actuator
C: power transmission mechanism
D1, D2: identification band
E: optotype

The invention claimed is:
1. An assembly support system, comprising:
automatic analyzer, comprising:
    a light source and a spectroscopic detector;
    a plurality of dispensing units; and
    a plurality of pump units connected to the respective dispensing units, wherein each of the plurality of pump units includes:
        a syringe tube that has a liquid port at one end and an opening at another end;
        a syringe base that is attached to the opening at the other end of the syringe tube;
        a plunger that penetrates the syringe base and whose tip end is inserted inside the syringe tube;
        a seal piece that is configured to seal a gap between the plunger and the syringe base;
        an actuator that individually drives the respective pump unit; and
        a power transmission mechanism that connects the actuator and the plunger,
    each plunger of the plurality of pump units has an individually set diameter and a different thickness, and
    at least one of the syringe base and the syringe tube is color coded for a molding color according to the a diameter of the corresponding plunger, plunger to represent and represents the diameter of the corresponding plunger,
a monitor;
a camera;
a memory configured to store registration data indicating assembly positions and the colors of the syringe tube and the syringe base of each of the plurality of pump units;

and at least one processor that is configured to:

collate a captured image of the plurality of pump units with the registration data, determine whether assembly positions of the syringe tube and the syringe base are correct, and display and output a determination result on the monitor, and upon determining the assembly positions of the syringe tube and the syringe base are incorrect, output an interlock signal for prohibiting a dispensing operation to the automatic analyzer.

2. The assembly support system according to claim 1, wherein the color of the syringe base indicates the diameter of the corresponding plunger, and wherein the color of the syringe tube indicates a classification of the diameter of the corresponding plunger, the classification indicating a range of diameters.

3. The assembly support system according to claim 1, further comprising:

an identification band that is provided on a hose connecting the liquid port and the dispensing unit and has a color corresponding to the color of the corresponding syringe tube.

4. The assembly support system according to claim 1, wherein outer shapes of the syringe tube, the syringe base, the actuator, and the power transmission mechanism are the same among the plurality of pump units.

5. The assembly support system according to claim 1, wherein the plurality of pump units are horizontally disposed in one row along a same plane.

6. The assembly support system according to claim 1, wherein the plurality of pump units have optotypes at corresponding positions.

7. The assembly support system according to claim 1 wherein the at least one processor is configured to display and output the registration data of the automatic analyzer to the monitor.

\* \* \* \* \*